(12) United States Patent
No (10) Patent No.: US 9,463,784 B2
(45) Date of Patent: Oct. 11, 2016

(54) ELECTRONIC PARKING BRAKE SYSTEM

(71) Applicant: MANDO CORPORATION, Pyeongtaek-si, Gyeonggi-do (KR)

(72) Inventor: Su-Hwan No, Gunpo-si (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 88 days.

(21) Appl. No.: 14/266,311

(22) Filed: Apr. 30, 2014

(65) Prior Publication Data
US 2014/0326549 A1    Nov. 6, 2014

(30) Foreign Application Priority Data

May 2, 2013  (KR) .................. 10-2013-0049292

(51) Int. Cl.
| | |
|---|---|
| *B60L 7/00* | (2006.01) |
| *B60T 17/22* | (2006.01) |
| *B60T 13/74* | (2006.01) |

(Continued)

(52) U.S. Cl.
CPC ............ *B60T 17/221* (2013.01); *B60T 8/885* (2013.01); *B60T 13/741* (2013.01); *B60T 2270/406* (2013.01); *F16D 2125/40* (2013.01); *F16D 2125/48* (2013.01)

(58) Field of Classification Search
CPC .... B60T 13/741; B60T 13/74; B60T 17/221; B60T 2270/406; B60T 17/22
USPC ......... 188/158, 161; 73/39; 340/453; 701/70
See application file for complete search history.

(56) References Cited

U.S. PATENT DOCUMENTS 4,062,224 A * 12/1977 Zeleney .................. G01L 5/284
                                                        73/121
4,122,434 A * 10/1978 Jensen .................... B60T 17/22
                                                        303/20

(Continued)

FOREIGN PATENT DOCUMENTS

| CN | 202358078 U | 8/2012 | |
|---|---|---|---|
| EP | 0924128 A1 * | 6/1999 | ............ B60T 13/74 |
| KR | 10-2011-0138058 A | 12/2011 | |

OTHER PUBLICATIONS

Chinese Office Action issued in Application No. 201410181994.1 dated Feb. 2, 2016.

*Primary Examiner* — Robert A Siconolfi
*Assistant Examiner* — Mahbubur Rashid
(74) *Attorney, Agent, or Firm* — McDermott Will & Emery LLP (57) ABSTRACT

Disclosed is an electronic parking brake (EPB) system including an EPB actuator, having a motor, to operate the motor to generate parking brake force with respect to a wheel. The EPB system includes a test device connected to the EPB actuator to test a function, performance, or breakdown of the EPB actuator. The test device includes a connection cable provided at one side of a main body of the test device such that the connection cable is electrically connected to the EPB actuator, a diagnosis switch provided at a front of the main body to allow a user to input a diagnosis command for the EPB actuator, a diagnosis lamp provided at the front of the main body to indicate whether the EPB actuator has broken down, and a battery mounted in the main body to supply power for diagnosis to test the EPB actuator. When the diagnosis switch is input, the test device supplies power from the battery to the EPB actuator to diagnose whether the EPB actuator is abnormal and the diagnosis lamp is turned on or off based on the diagnosis result.

6 Claims, 4 Drawing Sheets

(51) Int. Cl.
  *B60T 8/88*   (2006.01)
  *F16D 125/40*   (2012.01)
  *F16D 125/48*   (2012.01)

(56) References Cited

U.S. PATENT DOCUMENTS

| | | | | |
|---|---|---|---|---|
| 5,279,152 A * | 1/1994 | Griffin | .................... | B60T 8/885 73/121 |
| 5,433,296 A * | 7/1995 | Webberley | .............. | B60T 17/22 188/1.11 L |
| 6,330,938 B1 * | 12/2001 | Herve | .................... | B60T 7/107 188/156 |
| 6,802,401 B1 * | 10/2004 | Bohm | .................... | B60T 7/042 188/158 |
| 8,182,050 B2 * | 5/2012 | Jackson | .................. | B60T 7/122 303/191 |
| 8,220,877 B2 * | 7/2012 | Makishima | ............... | B60T 7/22 188/158 |
| 8,707,775 B2 * | 4/2014 | Semones | ............... | B60T 17/228 73/121 |
| 2003/0006644 A1 * | 1/2003 | MacGregor | ............... | B60T 7/10 303/3 |
| 2004/0263178 A1 * | 12/2004 | Klaus | .................... | B60T 13/683 324/504 |
| 2006/0071548 A1 * | 4/2006 | Scheider | .............. | G01R 31/007 303/122.04 |

* cited by examiner

ELECTRONIC PARKING BRAKE SYSTEM

CROSS-REFERENCE TO RELATED APPLICATION

This application claims the benefit of Korean Patent Application No. 210-2013-0049292, filed on May 2, 2013 in the Korean Intellectual Property Office, the disclosure of which is incorporated herein by reference.

BACKGROUND

1. Field

Embodiments of the present invention relate to an electronic parking brake (EPB) system including an EPB actuator, having a motor, to operate the motor to generate parking brake force with respect to a wheel.

2. Description of the Related Art

Generally, a brake system includes a parking brake, which is normally referred to as a hand brake or a side brake, to keep a vehicle stationary. The parking brake is actuated as a driver operates a parking lever provided at one side of a driver's seat within a vehicle. If the driver pulls the parking lever, a cable connected to the parking lever is pulled, serving to keep a rear wheel brake assembly connected to the cable in an operated state. In this way, brake force is generated. On the contrary, the cable is released when the parking lever is released, which releases the brake force.

The above-described actuation of the parking brake using the parking lever requires the driver to directly operate the parking lever. If the driver parks a vehicle without pulling the parking lever by mistake, the vehicle may unintentionally move, e.g., on an incline, causing unexpected accidents. Furthermore, operation of the parking lever whenever parking a vehicle or initiating vehicle traveling may make use troublesome. In particular, women or the old and the weak have difficulty in operating the parking lever.

For this reason, an electronic parking brake (EPB) system has been developed to electronically control actuation of the parking brake. The EPB system is mounted at a normal disc brake to function as a parking brake.

Even if the driver does not manually operate the parking brake, the EPB system automatically applies or releases the parking brake through a simplified switching operation or according to control of an electronic control unit which generally controls the parking brake.

The EPB system includes an actuator having a motor to generate brake force and an electronic control unit to control the actuator.

The electronic control unit control the actuator based on switch manipulation to apply or release the EPB system.

With recent increase in use of the EPB system, maintenance and inspection of vehicles having the EPB system mounted therein have been required.

Therefore, there is a high necessity for a system that more simply tests the actuator of the EPB system.

SUMMARY

Therefore, it is an aspect of the present invention to provide an electronic parking brake (EPB) system that simply tests abnormality of an EPB actuator.

It is another aspect of the present invention to provide an EPB system that operates an EPB actuator in emergency through simply switch manipulation as needed in addition to test of the EPB actuator.

Additional aspects of the invention will be set forth in part in the description which follows and, in part, will be obvious from the description, or may be learned by practice of the invention.

In accordance with one aspect of the present invention, an EPB system including an EPB actuator, having a motor, to operate the motor to generate parking brake force with respect to a wheel includes a test device connected to the EPB actuator to test a function, performance, or breakdown of the EPB actuator. The test device includes a connection cable provided at one side of a main body of the test device such that the connection cable is electrically connected to the EPB actuator, a diagnosis switch provided at a front of the main body to allow a user to input a diagnosis command for the EPB actuator, a diagnosis lamp provided at the front of the main body to indicate whether the EPB actuator has broken down, and a battery mounted in the main body to supply power for diagnosis to test the EPB actuator, wherein, when the diagnosis switch is input, the test device supplies power from the battery to the EPB actuator to diagnose whether the EPB actuator is abnormal and the diagnosis lamp is turned on or off based on the diagnosis result.

The test device may be connected to the EPB actuator, which is electrically separated from an electronic control unit to perform overall control of the EPB system, via the connection cable, when the diagnosis switch is input, the test device may supply insufficient current to drive the motor of the EPB actuator from the battery to the motor, the diagnosis lamp may be turned on by current fed back from the EPB actuator when the EPB actuator is normal, and the diagnosis lamp may be turned off when the EPB actuator has broken down.

The breakdown of the EPB actuator may include at least one selected from between cutoff and short circuit of the motor.

The EPB system may further include a power cable provided at the other side of the main body such that the power cable is connected to a vehicle battery and a parking application button for a parking application mode and a parking release button for a parking release mode provided at the front of the main body, wherein the test device may control the EPB actuator to execute the parking application mode when the parking application button is turned on and control the EPB actuator to execute the parking release mode when the parking release button is turned on.

The EPB system may further include a manual manipulation button provided at the front of the main body, wherein the test device may control the EPB actuator to execute the parking application mode for a time during which the manual manipulation button is on when the manual manipulation button is turned on and control the EPB actuator to stop execution of the parking application mode when the manual manipulation button is turned off.

In accordance with another aspect of the present invention, an EPB system including an EPB actuator, having a motor, to operate the motor to generate parking brake force with respect to a wheel includes a test device connected to the EPB actuator to operate the EPB actuator in emergency. The test device includes a connection cable provided at one side of a main body of the test device such that the connection cable is electrically connected to the EPB actuator, a power cable provided at the other side of the main body such that the power cable is connected to a vehicle battery, and a parking application button for a parking application mode and a parking release button for a parking release mode provided at a front of the main body, wherein the test device controls the EPB actuator to execute the parking application mode when the parking application button is turned on and controls the EPB actuator to execute the parking release mode when the parking release button is turned on.

The EPB system may further include a manual manipulation button provided at the front of the main body, wherein the test device may control the EPB actuator to execute the parking application mode for a time during which the manual manipulation button is on when the manual manipulation button is turned on and control the EPB actuator to stop execution of the parking application mode when the manual manipulation button is turned off.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings. The embodiments described in the following specification are given by way of example to sufficiently provide concept of the present invention to a person having ordinary skill in the art to which the present invention pertains. However, it will be understood that the present invention should not be limited to the embodiments and may be modified in various ways. In the drawings, elements unrelated to the embodiments of the present invention are omitted from depiction for clarity, and the component's width, length, thickness, etc. are exaggerated for convenience. Wherever possible, the same reference numbers will be used throughout the specification to refer to the same or like parts.

It will be understood that the term "and/or" refers to one or more possible combinations of specified relevant items and includes such combinations. In addition, the term "connected/coupled" refers to direct connection or indirect connection via another component. In this specification, the singular forms are intended to include the plural forms as well, unless the context clearly indicates otherwise. In addition, the term "includes" or "including" used in this specification designates presence of components, steps, operations, elements, and devices but do not exclude presence or addition of one or more other components, steps, operations, elements, and devices.

Based on an operation mode thereof, an electronic parking brake (EPB) system may be one of cable puller, motor-on-caliper, and hydraulic parking brake types. Even if a driver does not manually operate a parking brake, the EPB system is automatically actuated to keep a vehicle parked or stationary in the case of a vehicle stop or if there is a risk of a vehicle moving backward when started on an incline.

Figure 1:
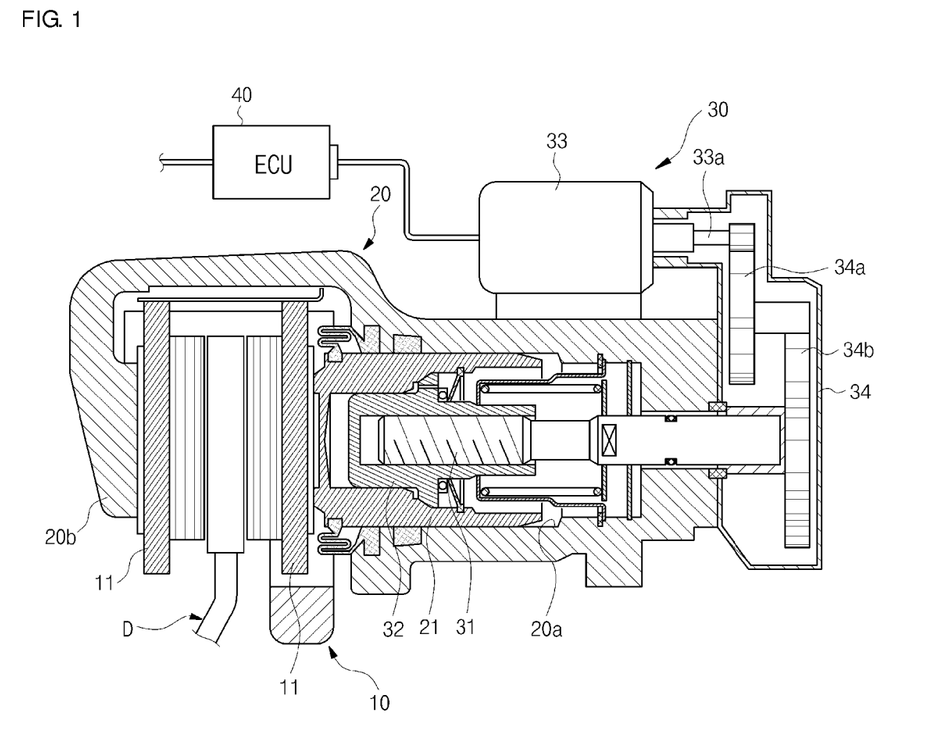
FIG. 1 is a view schematically showing construction of an electronic parking brake (EPB) system according to an embodiment of the present invention.

FIG. 1 is a view schematically showing construction of an EPB system according to an embodiment of the present invention. In this embodiment, the EPB system is of a motor-on-caliper type.

Referring to FIG. 1, the EPB system may include an EPB actuator 30 to actuate a disc brake 10 and 20 provided at a vehicle wheel to generate brake force and an electronic control unit (ECU) 40 to control operation of the EPB actuator 30.

The disc brake 10 and 20 includes a carrier 10 coupled to a vehicle body, the carrier 10 having a pair of frictional pads 11 spaced apart from each other therein, and a caliper housing 20 mounted at the carrier 10 such that the friction pads 11 advances and retreats, the caliper housing 20 having a cylinder 20a in which a piston 21 is mounted such that the cylinder 20a advances and retreats to press the frictional pads 11 using a disc D and a finger 20b provided at the other end.

The EPB actuator 30 includes an actuation shaft 31 rotatably mounted in the cylinder 20a of the caliper housing 20, a press sleeve 32 mounted inside the piston 21 such that the press sleeve 32 advances and retreats according to rotation of the actuation shaft 31 to press or release the piston 21, a motor 33 to rotate the actuation shaft 31 in the forward direction and the reverse direction, and a reduction gear assembly 34 including a plurality of gears 34a and 34b to transmit power generated by a rotary shaft 33a of the motor 33 to the actuation shaft 31 while reducing the number of rotations.

Figure 2:
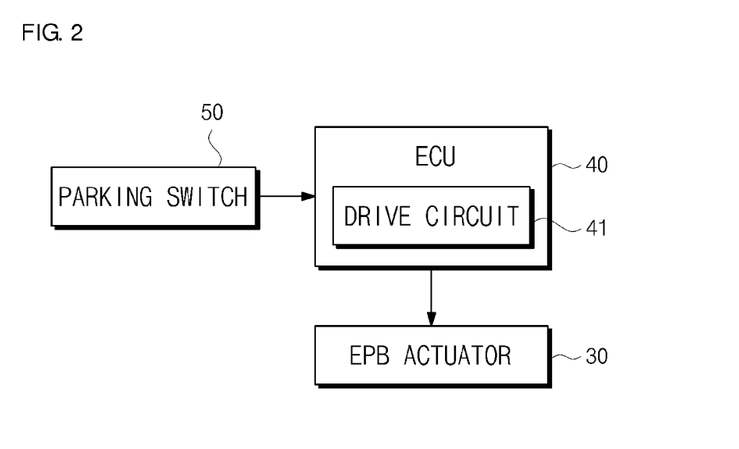
FIG. 2 is a control block diagram of the EPB system according to the embodiment of the present invention.

FIG. 2 is a control block diagram of the EPB system according to the embodiment of the present invention.

Referring to FIG. 2, the EPB system includes an EPB actuator 30 having a motor 33 to generate brake force, an electronic control unit 40 having a drive circuit 41 to drive the EPB actuator 30, and a parking switch 50 turned on or off by a driver to manipulate parking of a vehicle.

When turned on by the driver, the parking switch 50 transmits a parking application signal to apply the EPB actuator 30 to the electronic control unit 40. When turned off by the driver, the parking switch 50 transmits a parking release signal to release the EPB actuator 30 to the electronic control unit 40.

That is, the EPB actuator 30 is applied or released based on a manipulated state of the parking switch 50.

When the parking application signal is input from the parking switch 50, therefore, the electronic control unit 40 rotates the motor 33 of the EPB actuator 30 in one direction to apply the EPB actuator 30. When the parking release signal is input from the parking switch 50, on the other hand, the electronic control unit 40 rotates the motor 33 of the EPB actuator 30 in the other direction to release the EPB actuator 30.

Braking operation of the EPB system with the above-stated construction is as follows.

When the driver turns on the parking switch 50 to park, a parking application signal from the parking switch 50 is input to the electronic control unit 40. When the parking application signal is input, the electronic control unit 40 rotates the motor 33 of the EPB actuator 30 in one direction to actuate the disc brake 10 and 20 and thus to apply the EPB system.

That is, the electronic control unit 40 rotates the motor 33 of the EPB actuator 30 in one direction through the drive circuit 41. Rotational speed of the motor 33 in one direction is reduced by the reduction gear assembly 34. As a result, the actuation shaft 31 is rotated in one direction while large force is applied to the actuation shaft 31. As the actuation shaft 31 is rotated in one direction, the press sleeve 32 moves in an axial direction. As the press sleeve 32 presses the piston 21, the two frictional pads 11 press the disc D to brake a wheel.

Figure 3:
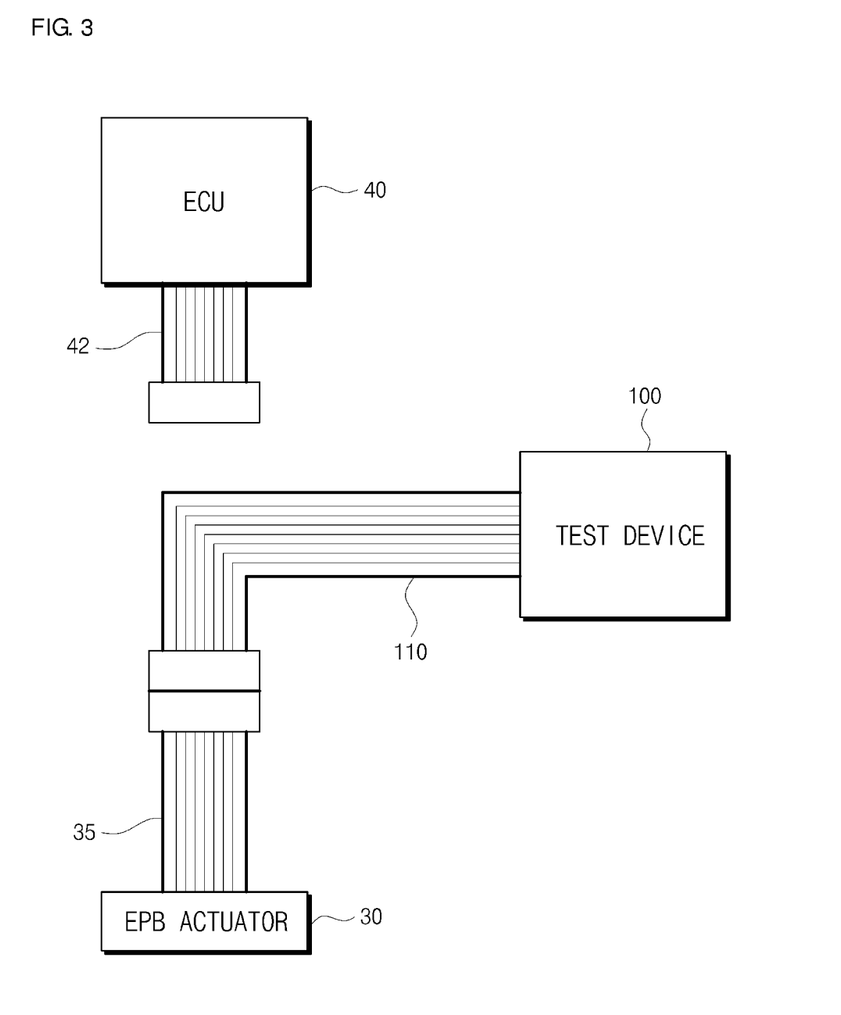
FIG. 3 is a view illustrating that a test device of an EPB system according to an embodiment of the present invention is connected to an EPB actuator to test and/or operate the EPB actuator in emergency.

FIG. 3 is a view illustrating that a test device of an EPB system according to an embodiment of the present invention is connected to an EPB actuator to test and/or operate the EPB actuator in emergency.

Referring to FIG. 3, a test device 100 to test whether the EPB system is normal or abnormal is connected to the EPB actuator 30, which is separated from the electronic control unit 40, via a connection cable.

In the EPB system, the electronic control unit 40 and the EPB actuator 30 are electrically connected to each other via connection cables 42 and 35. A connection cable 110 of the test device 100 is connected to the connection cable 35 of the EPB actuator 30 in a state in which the connection cable 35 of the EPB actuator 30 is separated from the connection cable 42 of the electronic control unit 40.

Figure 4:
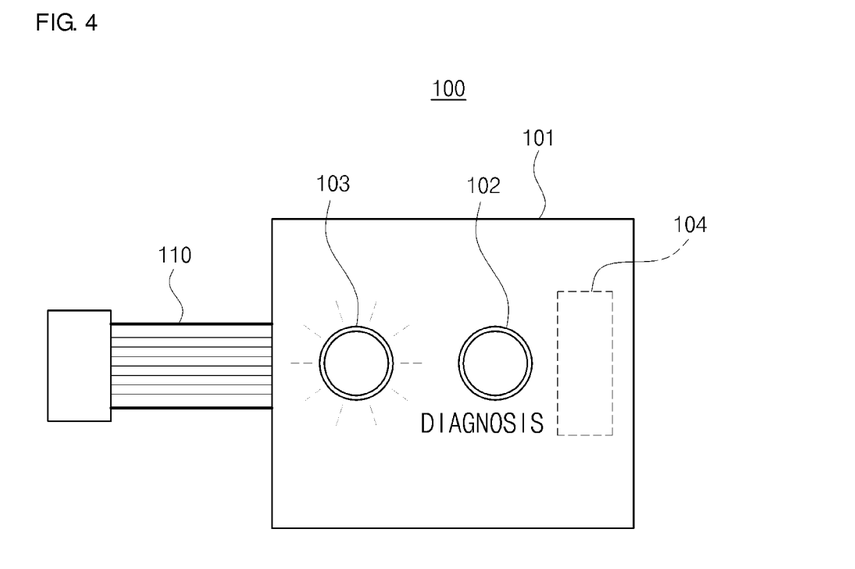
FIG. 4 is a view showing construction of the test device of the EPB system according to the embodiment of the present invention.

FIG. 4 is a view showing construction of the test device of the EPB system according to the embodiment of the present invention. Referring to FIG. 4, the test device 100 includes a main body 101. The connection cable 110 is connected to one side of the main body 101. A diagnosis switch 102 and a diagnosis lamp 103 are provided at the front of the main body 101. A battery 104 as a diagnosis power source to test the EPB actuator 30 is mounted in the main body 101.

In order to operate the EPB actuator 30, specifically the motor 33 of the EPB actuator 30, no load current may be supplied to the motor 33. The motor 33 may not be operated by current lower than no load current.

In this embodiment, cutoff and/or short circuit of the EPB actuator 30 may be inspected or diagnosed using such a principle.

That is, when the diagnosis switch 102 is input, the test device 100 supplies insufficient current to drive the motor 33 of the EPB actuator 30 from the battery 104 via the connection cables 110 and 35 connected to the EPB actuator 30. After passing through the EPB actuator 30, the current lights the diagnosis lamp 103 of the test device 100.

When the diagnosis lamp 103 is turned on, therefore, a user may determine that the EPB actuator 30 is normal. When the diagnosis lamp 103 is turned off, on the other hand, the user may determine that the EPB actuator 30 is abnormal due to cutoff or short circuit.

Meanwhile, when the electronic control unit 40 to control the EPB actuator 30 is abnormal, the EPB actuator 30 may be driven in emergency to urgently operate the EPB system. In another embodiment, the EPB system may be urgently operated based on simple switch manipulation.

Figure 5:
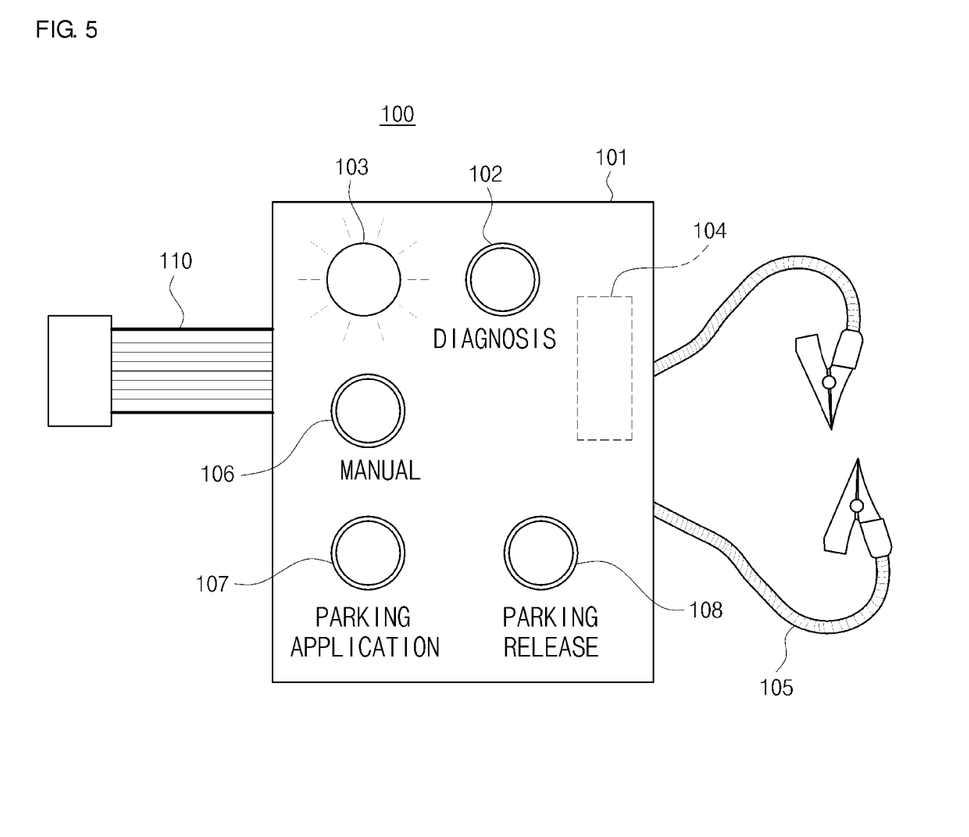
FIG. 5 is a view showing construction of a test device of an EPB system according to another embodiment of the present invention.

FIG. 5 is a view showing construction of a test device of an EPB system according to another embodiment of the present invention.

Referring to FIG. 5, various components to urgently operate the disc brake 10 and 20, which is the parking brake, may be provided at a main body 101 of a test device 100 in addition to a connection cable 110 to diagnose the EPB actuator 30, a diagnosis switch 102, a diagnosis lamp 103, and a battery 104.

A power cable 105, which may be connected to a vehicle battery, is provided at one side of the main body 101 of the test device 100. The power cable 105 is formed in the shape of pliers on which an anode/cathode is marked as in a jumper line of the vehicle.

In addition, a manual manipulation button 106 to select a manual manipulation mode, a parking application button 107 to select a parking application mode, and a parking release button 108 to select a parking release mode are provided at the front of the main body 101 of the test device 100.

When the parking application button 107 is pushed and turned on, power from the vehicle battery is supplied to the EPB actuator 30 via the power cable 105 such that the EPB actuator 30 may be operated. At this time, the motor 33 of the EPB actuator 30 is rotated in one direction to apply the EPB system.

When the parking release button 108 is pushed and turned on, the motor 33 of the EPB actuator 30 is rotated in the other direction to release the EPB system.

At this time, the manual manipulation mode or an automatic manipulation mode may be executed as the manual manipulation button 106 is turned on or off. When the manual manipulation mode is released, the automatic manipulation mode is executed.

The manual manipulation mode is executed only while the user pushes the parking application button 107 or the parking release button 108. That is, when the user pushes the parking application button 107 in a state in which the manual manipulation button 106 is on, the motor 33 of the EPB actuator 30 is rotated in one direction to apply the parking brake while the parking application button 107 is pushed. On the other hand, when the user pushes the parking release button 108 in a state in which the manual manipulation button 106 is on, the motor 33 of the EPB actuator 30 is rotated in the other direction to release the parking brake while the parking release button 108 is pushed.

The manual manipulation mode may be used to replace the frictional pads 11 of the disc brake 10 and 20 functioning as the parking brake or to adjust the disc brake 10 and 20 when the disc brake 10 and 20 malfunctions.

Figure 6:
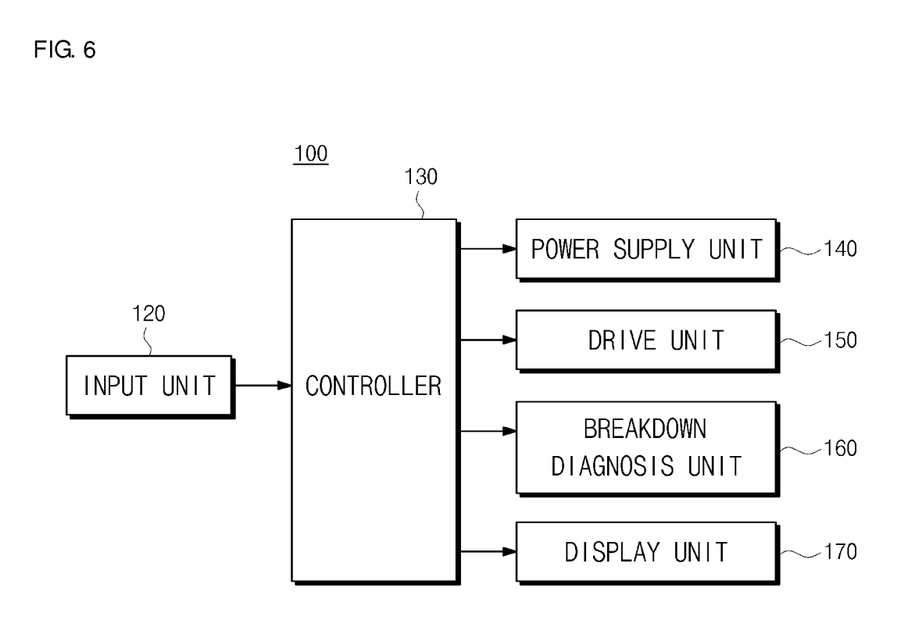
FIG. 6 is a control block diagram of the test device according to the embodiment of the present invention.

FIG. 6 is a control block diagram of the test device according to the embodiment of the present invention.

Referring to FIG. 6, the test device 100 may include an input unit 120, a controller 130, a power supply unit 140, a drive unit 150, a breakdown diagnosis unit 160, and a display unit 170.

The input unit 120 allows a user to input a diagnosis command or an urgent operation command. The input unit 120 may include a diagnosis switch 102 to input the diagnosis command and a first switch 106 and a second switch 107 to input the urgent operation command.

The power supply unit 140 includes a battery 104 mounted therein. In addition, the power supply unit 140 may include a vehicle battery connected via a power cable 105.

The drive unit 150 drives the EPB actuator 30.

The breakdown diagnosis unit 160 senses voltage or current of the EPB actuator 30 and diagnose whether the EPB actuator 30 has broken down based on the sensed voltage or current of the EPB actuator 30.

The display unit 170 displays whether the EPB actuator 30 has broken down.

When a user's diagnosis command is input through the input unit 120, the controller 130 controls the drive unit 150 to supply insufficient current to drive the motor 33 of the EPB actuator 30 from the power supply unit 140.

In addition, after the supply of current, the controller 130 senses voltage or current of the EPB actuator 30 through the breakdown diagnosis unit 160 and diagnose whether the EPB actuator 30 has broken down based on the sensed voltage or current of the EPB actuator 30. In a case in which the EPB actuator 30 has broken down, the controller 130 may display that the EPB actuator 30 has broken down through the display unit 170. On the other hand, in a case in which the EPB actuator 30 is normal, the controller 130 may display that the EPB actuator 30 is normal through the display unit 170.

Meanwhile, when a user's urgent operation command is input through the input unit 120, the controller 130 controls the drive unit 150 to supply sufficient current to operate the motor 33 to the EPB actuator 30.

That is, when the second switch 107 is turned on, the controller 130 recognizes that a parking application command has been issued and operates the EPB actuator 30 through the drive unit 150 to apply the parking brake. On the other hand, when the first switch 106 is turned on, the controller 130 recognizes that a manual manipulation command has been issued and controls the EPB actuator 30 to be operated through the drive unit 150 only while the first switch 106 is pushed.

As described above, cutoff or short circuit of the EPB actuator 30 may be easily diagnosed simply by connecting the test device 100 to the EPB actuator 30 via the connection cable and operating the diagnosis switch.

Even when the electronic control unit (ECU) 40 to control the EPB actuator 30 has broken down, the EPB actuator 30 and thus the EPB system may be operated in emergency simply by manipulating the parking application button 107 or the parking release button 108 of the EPB system. In the above embodiments, the EPB system to independently perform the EPB actuator diagnosis function and the test system including the diagnosis function and the function to operate the EPB actuator in emergency. However, embodiments of the present invention are not limited thereto. For example, an EPB system that performs only the urgent operation function without the diagnosis function may be provided.

As is apparent from the above description, according to an embodiment of the present invention, abnormality, such as cutoff and short circuit, of an EPB actuator may be diagnosed through connection to the EPB actuator and simple switch manipulation.

In addition, according to another embodiment of the present invention, the EPB actuator may be urgently operated through simple manual manipulation using a vehicle battery or other batteries in emergency. Even when a controller to control the EPB actuator has broken down, an EPB system may be operated in a parking application mode, a parking release mode, or a manual manipulation mode in which the EPB system is operated only while a user pushes a switch.

Although the embodiment of the present invention has been shown and described, it would be appreciated by those skilled in the art that changes may be made in these embodiments without departing from the principles and spirit of the invention, the scope of which is defined in the claims and their equivalents.

What is claimed is:

1. An electronic parking brake (EPB) system comprising an EPB actuator, having a motor, to operate the motor to generate parking brake force with respect to a wheel, the EPB system comprising:

a test device connected to the EPB actuator to test a function, performance, or breakdown of the EPB actuator, the test device comprising:
a connection cable provided at one side of a main body of the test device such that the connection cable is electrically connected to the EPB actuator;
a diagnosis switch provided at a front of the main body to allow a user to input a diagnosis command for the EPB actuator;
a diagnosis lamp provided at the front of the main body to indicate whether the EPB actuator has broken down;
a test device battery mounted in the main body to supply power for diagnosis to test the EPB actuator;
a power cable provided at the other side of the main body and connected to a vehicle battery; and
a parking application button for a parking application mode and a parking release button for a parking release mode provided at the front of the main body,
wherein when the diagnosis switch is input, the test device supplies power from the test device battery to the EPB actuator to diagnose whether the EPB actuator is abnormal and the diagnosis lamp is turned on or off based on the diagnosis result, and
wherein when the parking application button is turned on by the user, the test device controls the EPB actuator to execute the parking application mode so that power is supplied from the vehicle battery via the power cable and controls the EPB actuator to execute the parking release mode when the parking release button is turned on by the user.

2. The EPB system according to claim 1, wherein when the test device is connected to the EPB actuator, which is electrically separated from an electronic control unit to perform overall control of the EPB system, via the connection cable and the diagnosis switch is input, the test device supplies insufficient current to drive the motor of the EPB actuator from the test device battery to the motor, the diagnosis lamp is turned on by current fed back from the EPB actuator when the EPB actuator is normal, and the diagnosis lamp is turned off when the EPB actuator has broken down.

3. The EPB system according to claim 1, wherein the breakdown of the EPB actuator comprises at least one selected from between cutoff and short circuit of the motor.

4. The EPB system according to claim 1, further comprising:
a manual manipulation button provided at the front of the main body, wherein
the test device controls the EPB actuator to execute the parking application mode for a time during which the manual manipulation button is on when the manual manipulation button is turned on and controls the EPB actuator to stop execution of the parking application mode when the manual manipulation button is turned off.

5. An EPB system comprising an EPB actuator, having a motor, to operate the motor to generate parking brake force with respect to a wheel, the EPB system comprising:
a test device connected to the EPB actuator to operate the EPB actuator in emergency, the test device comprising:
a connection cable provided at one side of a main body of the test device such that the connection cable is electrically connected to the EPB actuator;
a power cable provided at the other side of the main body such that the power cable is connected to a vehicle battery; and a parking application button for a parking application mode and a parking release button for a parking release mode provided at a front of the main body, wherein the test device controls the EPB actuator to execute the parking application mode when the parking application button is turned on by a user so that power is supplied from the vehicle battery via the power cable and controls the EPB actuator to execute the parking release mode when the parking release button is turned on by a user.

6. The EPB system according to claim 5, further comprising:

a manual manipulation button provided at the front of the main body, wherein the test device controls the EPB actuator to execute the parking application mode for a time during which the manual manipulation button is on when the manual manipulation button is turned on and controls the EPB actuator to stop execution of the parking application mode when the manual manipulation button is turned off.

\* \* \* \* \*